(12) United States Patent
Park et al.

(10) Patent No.: US 12,174,389 B2
(45) Date of Patent: Dec. 24, 2024

(54) WEARABLE ELECTRONIC DEVICE COMPRISING SPEAKER MODULE

(71) Applicant: Samsung Electronics Co., Ltd., Gyeonggi-do (KR)

(72) Inventors: Jeongwon Park, Gyeonggi-do (KR); Chulkwi Kim, Gyeonggi-do (KR); Younsang Yoo, Gyeonggi-do (KR); Jongmin Yoon, Gyeonggi-do (KR); Chanmin Park, Gyeonggi-do (KR); Donghyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/118,213

(22) Filed: Mar. 7, 2023

(65) Prior Publication Data

US 2023/0204965 A1    Jun. 29, 2023

Related U.S. Application Data

(63) Continuation of application No. PCT/KR2021/009331, filed on Jul. 20, 2021.

(30) Foreign Application Priority Data

Sep. 8, 2020    (KR) .................. 10-2020-0114560

(51) Int. Cl.
*G02B 27/01*    (2006.01)
*G02B 27/00*    (2006.01)
*G06F 1/16*    (2006.01)

(52) U.S. Cl.
CPC ..... *G02B 27/0176* (2013.01); *G02B 27/0093* (2013.01); *G06F 1/163* (2013.01);
(Continued)

(58) Field of Classification Search
CPC ............ G02B 27/0176; G02B 27/0093; G02B 2027/0138; G02B 2027/014;
(Continued)

(56) References Cited

U.S. PATENT DOCUMENTS

2004/0096078 A1    5/2004    Lin
2005/0275714 A1 *  12/2005   Ishikawa ................ G02C 11/06
                                                         348/14.02
(Continued)

FOREIGN PATENT DOCUMENTS

JP    2013-165403 A    8/2013
JP    2018-56698 A    4/2018
(Continued)

OTHER PUBLICATIONS

International Search Report dated Oct. 21, 2021.
Korean Office Action dated Oct. 8, 2024.

*Primary Examiner* — Adam R. Giesy
(74) *Attorney, Agent, or Firm* — Cha & Reiter, LLC

(57) ABSTRACT

A wearable electronic device is disclosed herein. The device includes a housing, a light output module disposed in the housing and configured to output an image, a speaker module disposed in the housing, the speaker module including a conductive plate and a coil surrounding the plate, a battery disposed in the housing, and a power transmission structure disposed in the housing, and configured to transmit power from the battery to the light output module, wherein at least a portion of the power transmission structure is disposed above the plate.

16 Claims, 12 Drawing Sheets

(52) U.S. Cl.
CPC .......... *G06F 1/1635* (2013.01); *G06F 1/1688* (2013.01); *G02B 2027/0138* (2013.01); *G02B 2027/014* (2013.01); *G02B 2027/0161* (2013.01)

(58) Field of Classification Search
CPC ........ G02B 2027/0161; G02B 27/0172; G02B 2027/0178; G02B 27/01; G02B 27/017; G06F 1/163; G06F 1/1635; G06F 1/1688; G06F 1/26; G06F 1/1681; G06F 1/1686; H04R 7/04; H04R 9/02; H04R 9/025; H04R 2499/11
See application file for complete search history.

(56) References Cited

U.S. PATENT DOCUMENTS

| | | |
|---|---|---|
| 2009/0075068 A1 | 3/2009 | Pyo et al. |
| 2014/0232981 A1 | 8/2014 | Sugihara |
| 2017/0025210 A1 | 1/2017 | Eng et al. |
| 2017/0307891 A1 | 10/2017 | Bucknor et al. |
| 2018/0095299 A1* | 4/2018 | Cazalet .................... G02C 5/12 |
| 2018/0096754 A1 | 4/2018 | Song et al. |
| 2018/0180895 A1 | 6/2018 | Pombo et al. |
| 2020/0089009 A1 | 3/2020 | Lee et al. |
| 2020/0271960 A1 | 8/2020 | Baek et al. |
| 2021/0250698 A1* | 8/2021 | Qi .......................... H04R 11/02 |

FOREIGN PATENT DOCUMENTS

| | | |
|---|---|---|
| KR | 10-2009-0027807 A | 3/2009 |
| KR | 10-2012-0105270 A | 9/2012 |
| KR | 10-2016-0048304 A | 5/2016 |
| KR | 10-1786613 B1 | 10/2017 |
| KR | 10-2018-0135487 A | 12/2018 |
| KR | 10-2019-0000522 A | 1/2019 |
| KR | 10-2019-0010345 A | 1/2019 |
| KR | 10-2019-0079252 A | 7/2019 |
| KR | 10-2019-0100105 A | 8/2019 |
| KR | 10-2020-0062949 A | 6/2020 |

* cited by examiner

WEARABLE ELECTRONIC DEVICE COMPRISING SPEAKER MODULE

CROSS-REFERENCE TO RELATED APPLICATIONS

This application is a continuation of International Application No. PCT/KR2021/009331, filed on Jul. 20, 2021, which is based on and claims priority to Korean Patent Application No. 10-2020-0114560, filed on Sep. 8, 2020, in the Korean Intellectual Property Office, the disclosures of which are incorporated by reference herein in their entireties.

TECHNICAL FIELD

Certain embodiments of the disclosure relate to a wearable electronic devices, and, more particularly, a wearable electronic device in which a speaker module is protected from electromagnetic interference.

BACKGROUND

With the development of electronic and communication technologies, electronic device have become increasingly miniaturized and light-weight, to such an extent that electronic devices worn on a user's body without inconvenience. For example, wearable electronic devices, such as head-mounted devices (HMD), smartwatches (or a smart-band), contact lens-type devices, ring-type devices, glove-type devices, shoe-type devices, or clothing-type devices, are commercially available. Since the wearable electronic devices are directly worn on a user's body, resulting in improved portability and user accessibility.

The head-mounted device is worn on a user's head or face. It is often used to implement augmented reality (AR) experiences for a user. For example, the head-mounted device may be implemented in the form of smart-glasses, and may allow display of information on a real-world object in the form of an image or text to the user within a portion of the user's field-of-view. The head-mounted device may also be used to provide virtual reality (VR) experiences for the user. For example, by displaying independent images to the user's left and right eyes, respectively, and providing audio output operative in tandem with the visual outputs, the head-mounted device may provide fully immersive VR experiences for the user.

SUMMARY

Wearable electronic devices are becoming smaller and lighter, further increasing user portability and convenience, and may involve integration of multiple components into a small mounting space, facilitating high computing performance. However, when a power line and a speaker are disposed near to each other, noise may be introduced to the speaker due to a magnetic field generated by the nearby power line.

According to certain embodiments of the disclosure, it is possible to provide a wearable electronic device which reduces speaker noise generated by electro-magnetic interference from other components.

However, the problems to be solved in the disclosure are not limited to the above-mentioned problems, and may be variously expanded without departing from the technical range of the disclosure.

According to certain embodiments of the disclosure, a wearable electronic device may include a housing, a light output module disposed in the housing and configured to output an image, a speaker module disposed in the housing, the speaker module including a conductive plate and a coil surrounding the plate, a battery disposed in the housing, a power transmission structure disposed in the housing, and configured to transmit power from the battery to the light output module, wherein at least a portion of the power transmission structure is disposed above the plate.

According to certain embodiments of the disclosure, a wearable electronic device may include a housing, a light output module disposed in the housing and configured to output an image, a speaker module disposed in the housing, the speaker module including a conductive plate and a coil surrounding the plate, a battery disposed in the housing, a connection terminal disposed in the housing and configured to receive power from an external electronic device, a power transmission structure disposed in the housing, and configured to transmit power from the battery to the light output module, wherein at least a portion of the power transmission structure is disposed above the plate A wearable electronic device according to certain embodiments of the disclosure includes a power line that at least partially overlaps a central area of a coil of a speaker. Since the central area of the coil of the speaker and the power line overlap each other, an imbalance in the magnetic field applied to the coil is reduced, so that interference-related noise generated from the speaker is reduced.

In addition to this, various effects identified directly or indirectly through this document may be provided.

DETAILED DESCRIPTION

Figure 1:
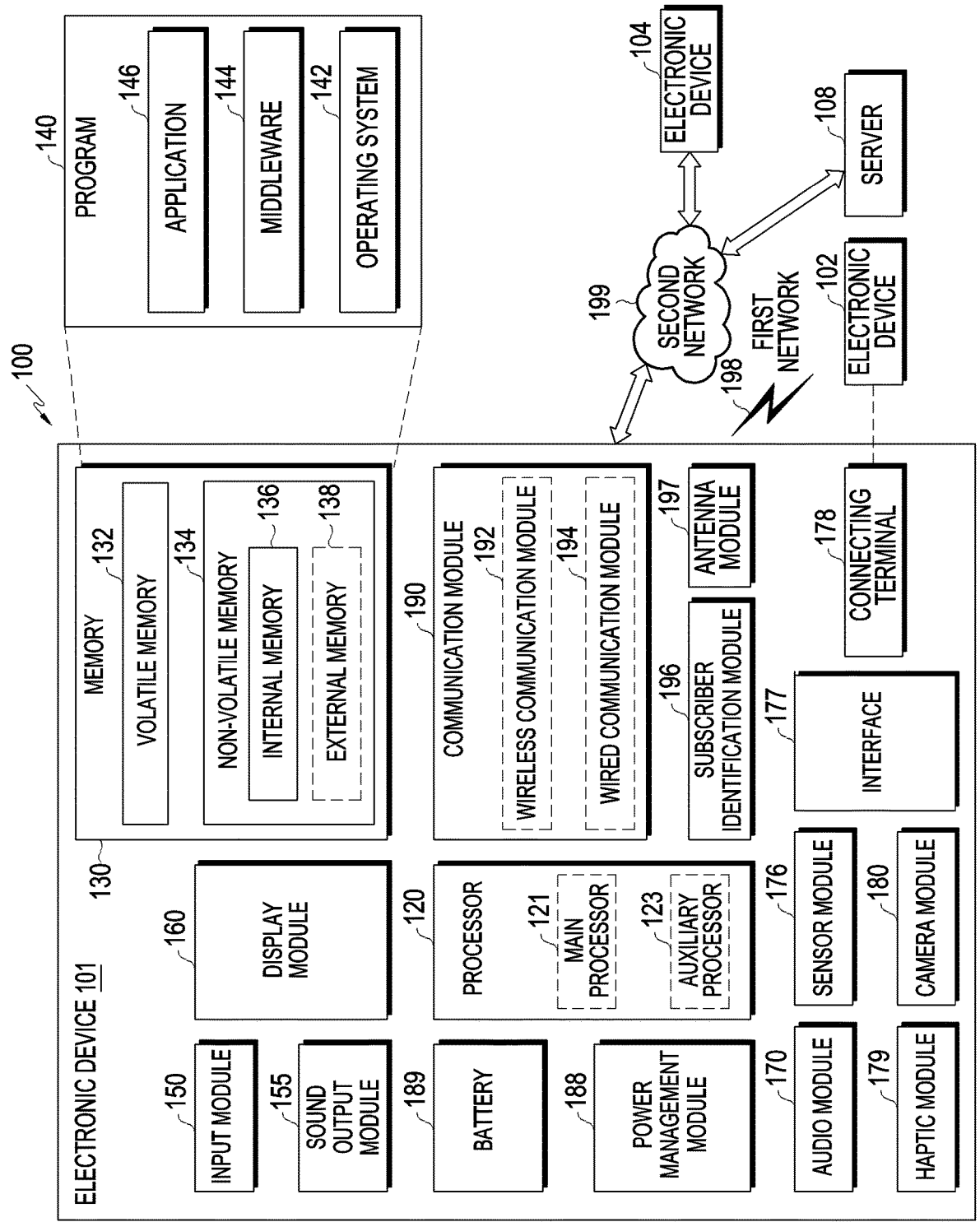
FIG. 1 is a block diagram of an electronic device according to certain embodiments of the disclosure in a network environment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
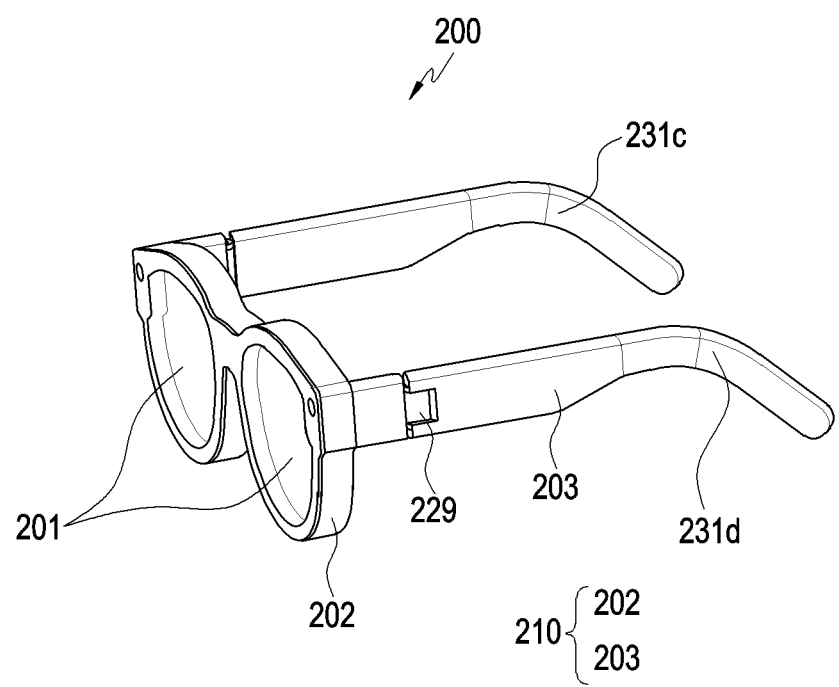
FIG. 2 is a perspective view of a wearable electronic device according to certain embodiments of the disclosure.

FIG. 2 is a perspective view of a wearable electronic device according to an embodiment of the disclosure.

Referring to FIG. 2, a wearable electronic device 200 (hereinafter, referred to as an "electronic device 200") is a glasses-type electronic device, and a user may visually recognize a surrounding object or environment in the state of wearing the electronic device 200. For example, the electronic device 200 may be a head-mounted device (HMD) or a smartglasses device capable of providing an image directly in front of the user's eyes. The configuration of the electronic device 200 of FIG. 2 may be wholly or partly the same as that of the electronic device 101 previously described in FIG. 1.

According to certain embodiments, the electronic device 200 may include a housing 210 that defines an exterior of the electronic device 200. The housing 210 may provide a space in which components of the electronic device 200 may be disposed. For example, the housing 210 may include a lens frame 202 and at least one wearing member 203.

According to certain embodiments, a display member 201 may provide visual information to a user. For example, the display member 201 may include a lens, a display, and/or a module equipped with a touch circuit. According to an embodiment, the display member 201 may be formed so as to be transparent or translucent. According to an embodiment, the display member 201 may include glass made of a translucent material or a window member the light transmittance of which may be adjusted as the color concentration thereof is adjusted. According to an embodiment, a pair of display members 201 may be provided and disposed so as to align with the user's left and light eyes, respectively, when the electronic device 200 is worn on the user's body.

According to certain embodiments, the lens frame 202 may at least partially accommodate the display members 201. For example, the lens frame 202 may at least partially surround the edges of the display members 201. According to an embodiment, the lens frame 202 may position at least one of the display members 201 so as to align with the user's eyes. According to an embodiment, the lens frame 202 may include a rim, in the manner of a common pair of eyeglasses. According to an embodiment, the lens frame 202 may include at least one closed curve surrounding the display member 201.

According to certain embodiments, the wearing member 203 may extend from the lens frame 202. For example, the wearing member 203 may extend from an end of the lens frame 202, and may be supported or positioned on the user's body (e.g., ears) together with the lens frame 202. According to an embodiment, the wearing member 203 may be rotatably coupled to the lens frame 202 via a hinge structure 229. According to an embodiment, the wearing member 203 may include an inner side surface 231c disposed so as to face the user's body and an outer side surface 231d disposed so as to be opposite to the inner side surface.

According to certain embodiments, the electronic device 200 may include a hinge structure 229 configured to allow the wearing member 203 to be folded relative to the lens frame 202. The hinge structure 229 may be disposed between the lens frame 202 and the wearing member 203. In a state in which the electronic device 200 is not being worn, the user may carry or store the electronic device 200 more conveniently by folding the wearing member 203 to overlap with the lens frame 202.

Figure 3:
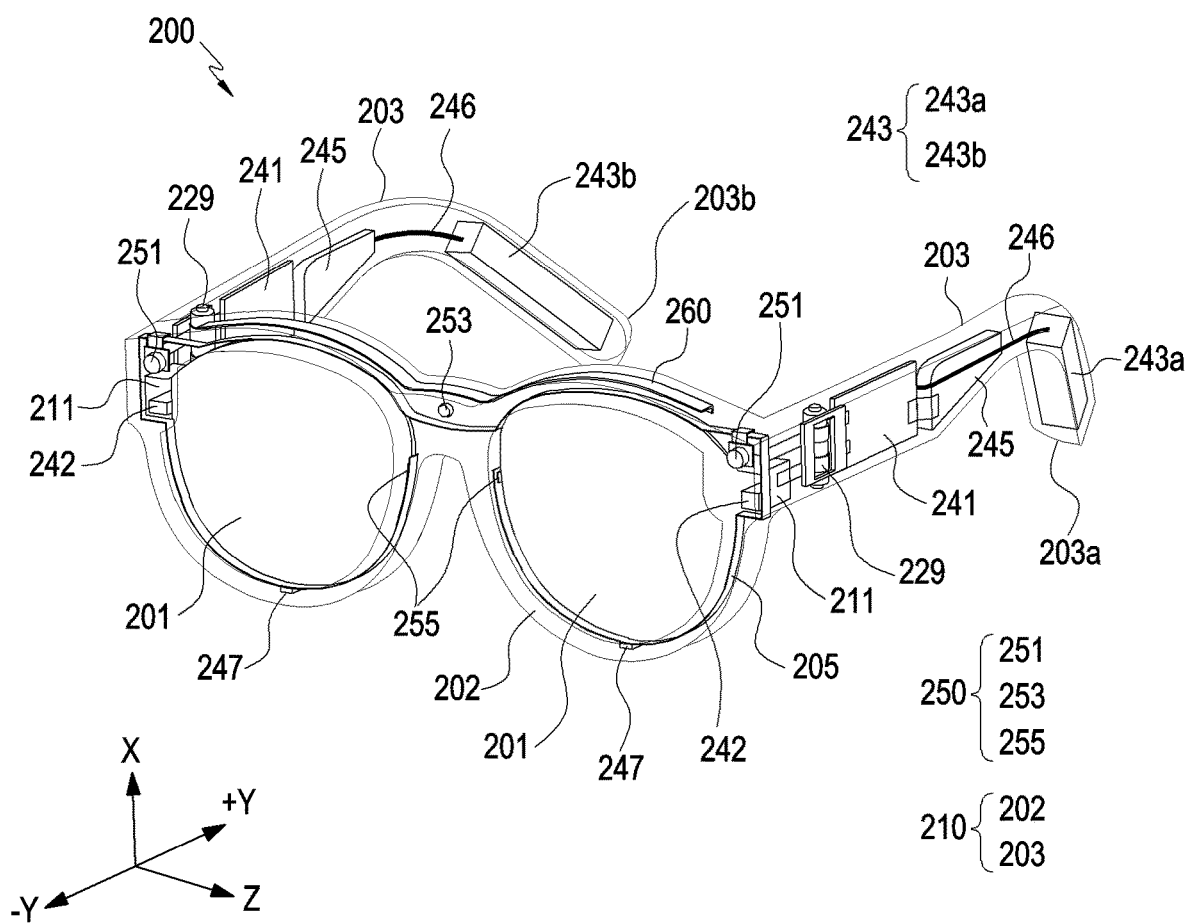
FIG. 3 is a perspective view illustrating the internal configuration of the wearable electronic device according to an embodiment of the disclosure.
Figure 4:
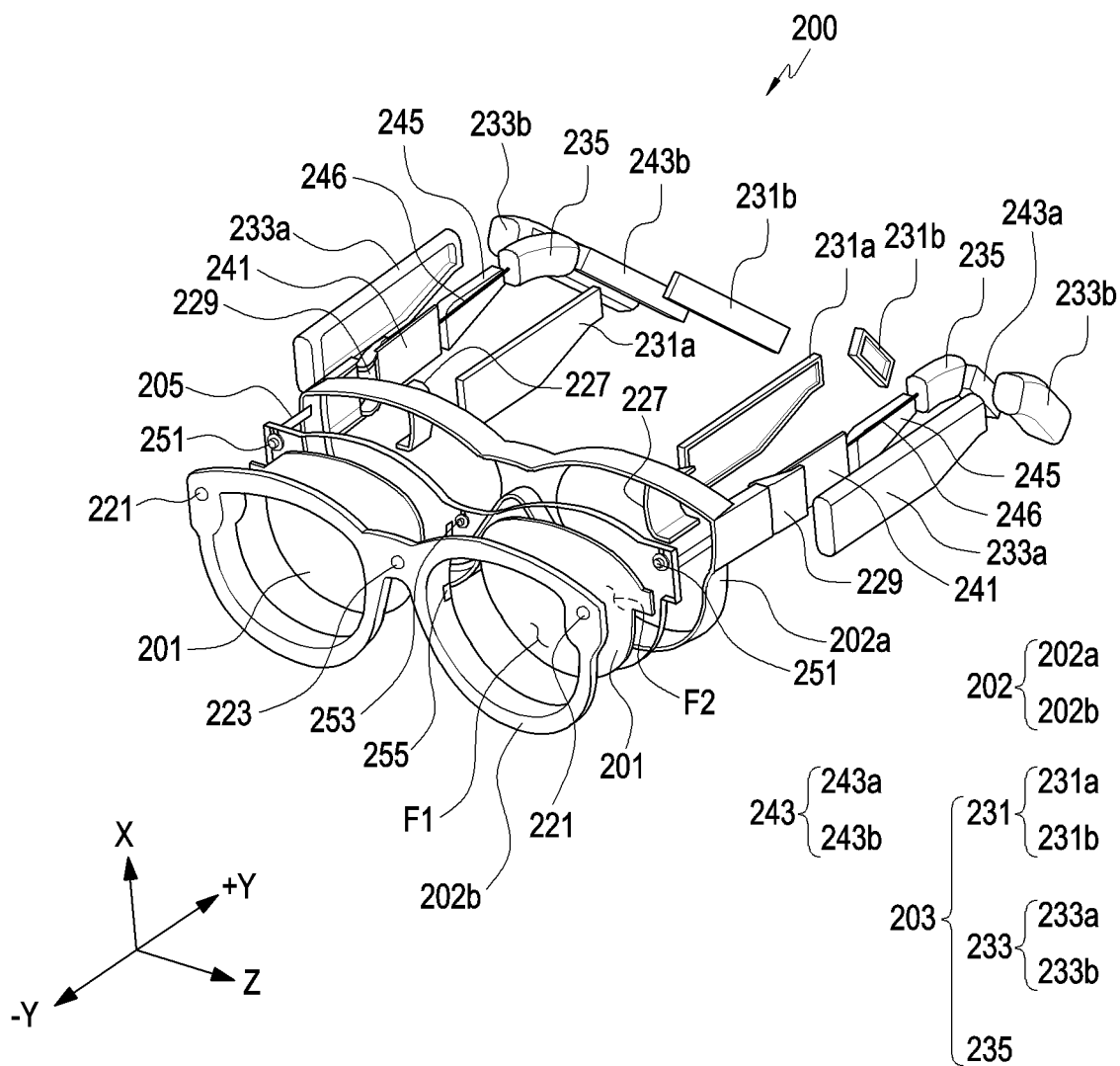
FIG. 4 is an exploded perspective view of the wearable electronic device according to an embodiment of the disclosure.

FIG. 3 is a perspective view illustrating the internal configuration of a wearable electronic device according to an embodiment of the disclosure. FIG. 4 is an exploded perspective view of the wearable electronic device according to an embodiment of the disclosure.

Referring to FIGS. 3 and 4, the electronic device 200 may include a plurality of components disposed within the housing 210, including for example, at least one circuit board 241 (e.g., a printed circuit board (PCB), a printed board assembly (PBA), a flexible PCB (FPCB), or a rigid-flexible PCB (RFPCB), in addition to at least one battery 243, at least one speaker module 245, at least one power transmission structure 246, and a camera module 250. All or some of the components of the housing 210 of FIG. 3 may be disposed in a same configuration as the display member 201, the lens frame 202, the wearing member 203, and the hinge structure 229 previously described with reference to FIG. 2.

According to certain embodiments, the electronic device 200 may acquire and/or recognize visual images regarding an object or environment in a direction of the user's gaze, which may correspond to an orientation in which the electronic device 200 is directed (e.g., the −Y direction), using the camera module 250 (e.g., the camera module 180 in FIG. 1), and may receive information about the object or environment from an external electronic device (e.g., the electronic devices 102 and 104 or the server 108 of FIG. 1) via a network (e.g., the first network 198 or the second network 199 in FIG. 1). In another embodiment, the electronic device 200 may provide the user with received information regarding the object or environment in audio or visual form. The electronic device 200 may provide the user with the received information regarding the object or environment in visual format via the display member 201, by using a display module (e.g., the display module 160 in FIG. 1). For example, the electronic device 200 may implement an augmented reality (AR) user experience by displaying the information regarding the object or environment in a visual form, combined with an actual image of the environment around the user, or direct user-viewing of the environment around the user (e.g., through transparent or translucent components).

According to certain embodiments, the display member 201 may include a first surface F1 which faces a direction corresponding to incidence of external light (e.g., the −Y direction) and a second surface F2 facing a direction opposite to the first surface F1 (e.g., the +Y direction). In a state in which the user is wearing the electronic device 200, the second surface F2 of the display member 201 may be disposed to face the user's left and/or right eyes, and may allow the light or image, which is incident through the first surface F1, to at least partially pass therethrough to enter the user's left eye and/or right eye.

According to certain embodiments, the lens frame 202 may include at least two frames. For example, the lens frame 202 may include a first frame 202a and a second frame 220b. According to an embodiment, when the user wears the electronic device 200, the first frame 202a may face the user's face, and the second frame 202b may be spaced apart from the first frame 202a in a direction of the user's gaze (e.g., the −Y direction).

According to certain embodiments, a light output module 211 may provide an image to a user. For example, the light output module may include a display panel (not illustrated) capable of outputting an image, and a lens (e.g., the first lens 211a in FIG. 6) which may correspond to the user's eye and guide the image to the display member 201. For example, the user may view an image that is output from the display panel of the light output module 211 through the lens of the light output module 211. According to certain embodiments, the light output module 211 may include a device configured to display various types of information. For example, the light output module 211 may include a liquid crystal display (LCD), a digital mirror device (DMD), a liquid crystal on silicon (LCoS), an organic light-emitting diode (OLED), or a micro light-emitting diode (micro-LED). According to an embodiment, when the light output module 211 and/or the display member 201 include one of an LCD, a DMD, or an LCoS, the electronic device 200 may include a light source configured to emit light to the light output module 211 and/or the display area of the display member 201. According to another embodiment, when the light output module 211 and/or the display member 201 include either an OLED or a micro-LED, the electronic device 200 may display a virtual image to the user without including a separate light source.

According to certain embodiments, the light output module 211 may be at least partially disposed in the housing 210. For example, the light output module 211 may be disposed on the wearing member 203 or the lens frame 202 so as to correspond to each of the user's right eye and left eye. According to an embodiment, the light output module 211 may be connected to the display member 201, and may display an image to the user via the display member 201.

According to certain embodiments, the circuit board 241 may include components for driving operations of the electronic device 200. For example, the circuit board 241 may include at least one integrated circuit chip, and at least one of the processor 120, the memory 130, the power management module 188, or the communication module 190 of FIG. 1 may be provided in the integrated circuit chip. According to an embodiment, the circuit board 241 may be disposed in the wearing member 203 of the housing 210. According to an embodiment, the circuit board 241 may be electrically connected to the battery 243 via the power transmission structure 246. According to an embodiment, the circuit board 241 may be connected to a flexible printed circuit board 205, and may transmit electrical signals to electronic components of the electronic device (e.g., the light output module 211, the camera module 250, and the speaker module 245) via the flexible printed circuit board 205. According to an embodiment, the circuit board 241 may include an interposer.

According to certain embodiments, the flexible printed circuit board 205 may extend from the circuit board 241 into the lens frame 202 across the hinge structure 229, and may be disposed on at least a portion of the periphery of the lens frame 202 in the lens frame 202.

According to certain embodiments, the electronic device 200 may include at least one light emitter 242. According to an embodiment, the light emitter 242 may emit light in a visible light band or an infrared (IR) band. According to an embodiment, the light emitter 242 may include a light-emitting diode (LED). For example, the light emitter 242 may provide state information of the electronic device 200 in an optical form. According to certain embodiments, the light emitter 242 may provide a light source interlocked with the operation of the first camera module 251. For example, the light emitter 242 may include an LED, an IR LED, and/or a xenon lamp.

According to certain embodiments, the battery 243 (e.g., the battery 189 in FIG. 1) may be electrically connected to the light output module 211, the circuit board 241, the speaker module 245, the microphone module 247, and the camera module 250 of the electronic device 200, and may supply power to the light output module 211, the circuit board 241, the speaker module 245, the microphone module 247, and the camera module 250.

According to certain embodiments, at least a portion of the battery 243 may be disposed within the wearing member 203. According to an embodiment, the battery 243 may be disposed at or near an end 203a or 203b of the wearing member 203. For example, the battery 243 may include a first battery 243a disposed in a first end 203a of the wearing member 203, and a second battery 243b disposed in a second end 203b.

According to certain embodiments, the speaker module 245 (e.g., the audio module 170 or the sound output module 155 in FIG. 1) may convert an electrical signal into sound. At least a portion of the speaker module 245 may be disposed in the wearing member 203 of the housing 210. According to an embodiment, the speaker module 245 may be located in the wearing member 203 so as to correspond in position to a user's ear. For example, the speaker module 245 may be disposed between the circuit board 241 and the battery 243.

According to certain embodiments, the power transmission structure 246 may transmit power from the battery 243 to an electronic component (e.g., the light output module 211) of the electronic device 200. For example, the power transmission structure 246 may be electrically connected to the battery 243 and/or the circuit board 241, and the circuit board 241 may transmit, to the light output module 211, power received via the power transmission structure 246. According to an embodiment, the power transmission structure 246 may pass through the speaker module 245 to be connected to the circuit board 241. For example, when viewing the electronic device 200 from a side (e.g., in the Z-axis direction), the power transmission structure 246 may at least partially overlap the speaker module 245.

According to certain embodiments, the power transmission structure 246 may be configured to transmit power. For example, the power transmission structure 246 may include a flexible printed circuit board or a wire. For example, the wire may include a plurality of cables (not illustrated). The plurality of (e.g., 2 to 6) cables may be connected in at least one set (e.g., a bundled structure). According to certain embodiments, the power transmission structure 246 (e.g., a wire) may have a circular or rectangular cross section. In certain embodiments, the shape of the power transmission structure 246 may be variously modified in consideration of the number and/or type of cables.

According to certain embodiments, the microphone module 247 (e.g., the input module 150 and/or the audio module 170 in FIG. 1) may convert sound into an electrical signal. According to an embodiment, the microphone module 247 may be disposed on at least a portion of the lens frame 202. For example, at least one microphone module 247 may be disposed at a lower end (e.g., the −X-axis direction) and/or at an upper end (e.g., the +X-axis direction) of the electronic device 200. According to certain embodiments, the electronic device 200 may more clearly recognize the user's voice by using voice information (e.g., sound) acquired by the at least one microphone module 247. For example, the electronic device 200 may distinguish voice information from ambient noise based on acquired voice information and/or additional information (e.g., low-frequency vibration of the user's skin and bone). For example, the electronic device 200 may clearly recognize the user's voice and may perform a function of reducing ambient noise (e.g., noise canceling).

According to certain embodiments, the camera module 250 may capture a still image and/or a video image. The camera module 250 may include at least one of a lens, at least one image sensor, an image signal processor, or a flash. According to an embodiment, the camera module 250 may be substantially disposed in the lens frame 202 and around the display member 201.

According to certain embodiments, the camera module 250 may include at least one first camera module 251. According to an embodiment, the first camera module 251 may photograph a motion of the user through a first optical hole 221 provided in the lens frame 202. For example, the first camera module 251 may photograph the user's gesture (e.g., hand motion). The first camera module 251 and/or the first optical hole 221 may be disposed at each side end of the lens frame 202 (e.g., the second frame 202b), for example, each end of the lens frame 202 (e.g., the second frame 202b) in the X direction. According to an embodiment, the first camera module 251 may be a global shutter (GS)-type camera. For example, the first camera module 251 may provide 360-degree spatial (e.g., omnidirectional) positional recognition and/or movement recognition with a camera supporting 3 degrees of freedom (3 DoF) or 6 DoF. According to an embodiment, the first camera module 251 may perform simultaneous localization and mapping (SLAM)

and user gesture recognition by using a plurality of global shutter-type cameras having the same standard and performance as stereo cameras.

According to an embodiment, the first camera module 251 may include an infrared (IR) camera (e.g., a time of flight (TOF) camera or a structured light camera). For example, the IR camera may be operated as at least a portion of a sensor module (e.g., the sensor module 176 in FIG. 1) configured to detect a distance to a subject.

According to certain embodiments, the camera module 250 may include a second camera module 253. According to an embodiment, the second camera module 253 may capture an external image. According to an embodiment, the second camera module 253 may be a global shutter-type or rolling shutter (RS)-type camera. According to an embodiment, the second camera module 253 may capture an external image through a second optical hole 223 provided in the second frame 202b. For example, the second camera module 253 may include a high-resolution color camera, and may be a high-resolution (HR) or photo video (PV) camera. In addition, the second camera module 253 may provide an auto focus (AF) function and an optical image stabilizer (OIS) function.

According to certain embodiments (not illustrated), the electronic device 200 may include a light emitter (not illustrated) disposed adjacent to the second camera module 253. For example, the light emitter (not illustrated) may provide light for increasing the brightness (e.g., illuminance) around the electronic device 200 when acquiring an external image of the second camera module 253, and may reduce difficulty of acquiring an image due to a dark environment, mixing of various light sources, and/or reflection of light.

According to certain embodiments, the camera module 250 may include at least one third camera module 255. According to an embodiment, the third camera module 255 may photograph the trace of the user's eyes (e.g., pupils) or gaze. For example, the third camera module 255 may photograph a reflection pattern of light emitted from the light emitter 242 toward the user's eyes. For example, the light emitter 242 may emit light in an infrared band for tracking the trajectory of the gaze using the first camera module 255. For example, the light emitter 242 may include an IR LED. According to an embodiment, in order to make a virtual image projected to the display members 201 correspond to the direction in which the user's pupils gaze, the processor (e.g., the processor 120 in FIG. 1) may adjust the position of the virtual image. According to an embodiment, the third camera module 255 may include a global shutter (GS)-type cameras, and it is possible to track the trajectory of the user's eyes or gaze by using a plurality of third camera modules 255 having the same standard and performance.

According to certain embodiments, the third camera module 255 may periodically or non-periodically transmit information (e.g., trajectory information) related to the trajectory of the user's eyes or gaze to the processor. According to another embodiment, the third camera module 255 may transmit the trajectory information to the processor when detecting that the user's gaze has changed based on the trajectory information (e.g., when the eyes have moved by a reference value or more in the state in which the head does not move).

According to an embodiment, at least one of the first camera module 251 or the third camera module 255 may be replaced with a sensor module (e.g., the sensor module 176 in FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera modules 251, the second camera module 253, or the third camera modules 255 may include a plurality of camera modules (not illustrated). For example, the second camera module 253 may include a plurality of lenses (e.g., wide-angle and telephoto lenses) and image sensors, and may be disposed on one surface (e.g., the surface oriented in the −Y axis direction) of the electronic device 200. For example, the electronic device 200 may include a plurality of camera modules having different attributes (e.g., angles of view) or functions, respectively, and may control the camera modules to change the angles of view thereof based on the user's selection and/or trajectory information. For example, at least one of the plurality of camera modules may be a wide-angle camera, and at least other one of the camera modules may be a telephoto camera.

According to certain embodiments, the processor (e.g., the processor 120 in FIG. 1) may determine the movement of the electronic device 200 and/or the user's gesture by using the information of the electronic device 200 acquired by using at least one of the gesture sensor, the gyro sensor, or the acceleration sensor of the sensor module (e.g., the sensor module 176 in FIG. 1) and the user's motion (e.g., the approach of the user's body to the electronic device 200) acquired by using the first camera module 251. According to an embodiment, in addition to the above-described sensors, the electronic device 200 may include a magnetic (geomagnetic) sensor capable of measuring an azimuth by using a magnetic field and a line of magnetic force and/or a Hall sensor capable of acquiring movement information (e.g., a movement direction or a movement distance) by using the intensity of the magnetic field. For example, the processor may determine the movement of the electronic device 200 and/or the movement of the user based on information acquired from the magnetic (geomagnetic) sensor and/or the Hall sensor.

According to certain embodiments (not illustrated), the electronic device 200 may perform an input function (e.g., a touch and/or a pressure detection function) capable of interacting with the user. For example, components configured to perform a touch and/or pressure detection function (e.g., a touch sensor and/or a pressure sensor) may be disposed on at least a portion of the wearing member 203. The electronic device 200 may control a virtual image output through the display members 201 based on the information acquired via the components. For example, the sensors related to a touch and/or pressure detection function may be configured in various types, such as a resistive type, a capacitive type, an electro-magnetic (EM) type, or an optical type. According to an embodiment, all or some of the components configured to perform a touch detection function and/or a pressure detection function may be the same as those of the input module 150 of FIG. 1.

According to certain embodiments, the electronic device 200 may include a reinforcing member 260 disposed in the inner space of the lens frame 202 and configured to have a higher rigidity than that of the lens frame 202.

According to certain embodiments, the lens frame 202 may include a hinge cover 227 capable of concealing a portion of the hinge structure 229. Another portion of the hinge structure 229 may be accommodated or concealed between inner case 231 and outer case 233, which will be described later.

According to certain embodiments, the wearing member 203 may include an inner case 231 and an outer case 233. The inner case 231 is, for example, a case configured to face the user's body or to come into direct contact with the user's body, and may be made of a material having low thermal conductivity (e.g., a synthetic resin). According to an embodiment, the inner case 231 may include an inner side surface 231c facing the user's body. The outer case 233 may at least partially include, for example, a material capable of transferring heat (e.g., a metal material), and may be coupled to face the inner case 231. According to an embodiment, the outer case 233 may include an outer side surface 231d opposite to the inner side surface 231c. In an embodiment, at least one of the circuit board 241 or the speaker module 245 may be accommodated in a space separated from the battery 243 within the wearing member 203. In the illustrated embodiment, the inner case 231 may include a first case 231a including the circuit board 241 or the speaker module 245, and a second case 231b configured to accommodate the battery 243, and the outer case 233 may include a third case 233a coupled to face the first case 231a and a fourth case 233b coupled to face the second case 231b. For example, the first case 231a and the third case 233a (hereinafter, referred to as a "first case portion 231a and 233a") may be coupled to accommodate the circuit board 241 and/or the speaker module 245, and the second case 231b and the fourth case 233b (hereinafter, referred to as a "second case portion 231b and 233b") may be coupled to accommodate the battery 243 or a connection terminal (e.g., the connection terminal 248 in FIG. 5).

According to certain embodiments, the first case portion 231a and 233a may be rotatably coupled to the lens frame 202 via the hinge structure 229, and the second case portion 231b and 233b may be connected or mounted to an end of the first case portion 231a and 233a via the connection member 235. In some embodiments, the portion of the connection member 235 that comes into contact with the user's body may be made of a material having low thermal conductivity (e.g., an elastic material such as silicone, polyurethane, or rubber), and the portion of the connection member 235 that does not come into contact with the user's body may be made of a material having a high thermal conductivity (e.g., a metal material). For example, when heat is generated from the circuit board 241 or the battery 243, the connection member 235 may block heat from being transferred to the portion that comes into contact with the user's body, and may diffuse or dissipate the heat through the portion that does not come into contact with the user's body. According to an embodiment, the portion of the connection member 235 that is configured to come into contact with the user's body may be interpreted as a portion of the inner case 231, and the portion of the connection member 235 that does not come into contact with the user's body may be interpreted as a portion of the outer case 233.

According to certain embodiments, in addition to the illustrated components, other components (e.g., the antenna module 197 in FIG. 1) may be further included, and information about an object or environment may be provided from an external electronic device (e.g., the electronic device 102 or 104 or the server 108 in FIG. 1) by using the communication module 190 via a network (e.g., the first network 198 or the second network 199 in FIG. 1).

Figure 5:
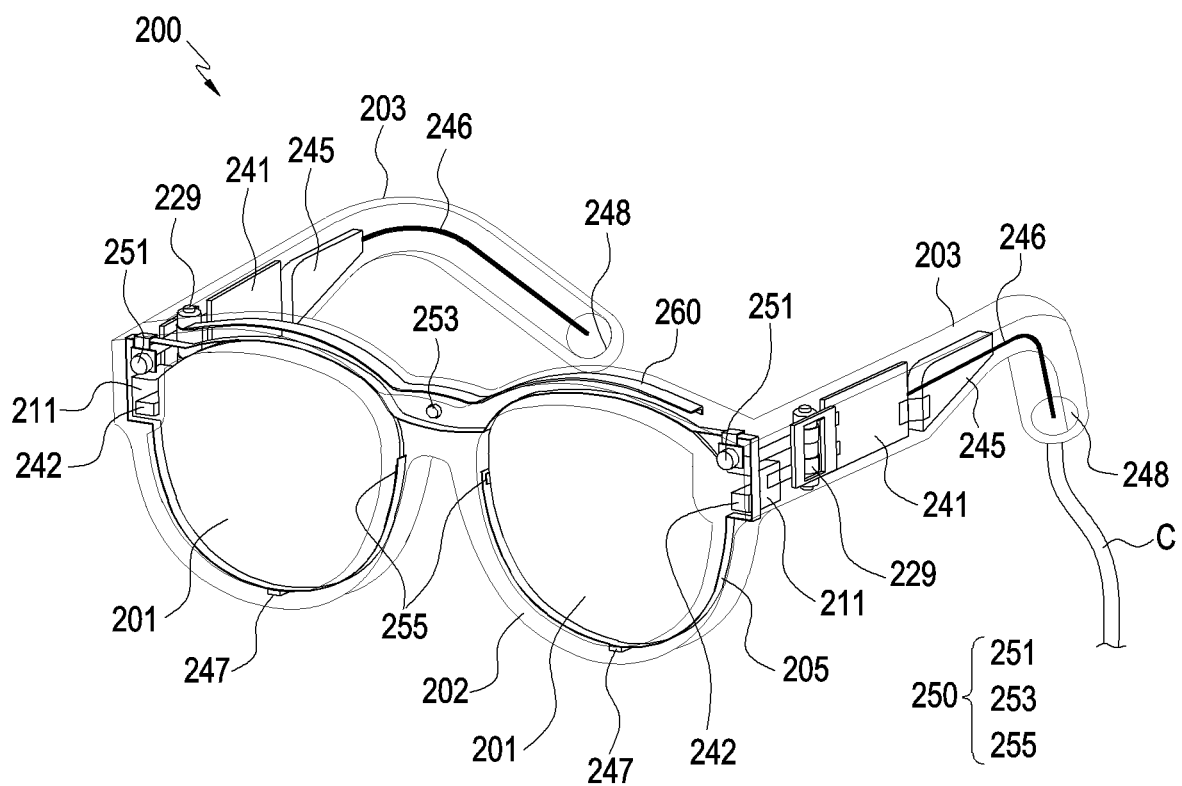
FIG. 5 is a perspective view illustrating an internal configuration of a wearable electronic device according to another embodiment of the disclosure.

FIG. 5 is a perspective view illustrating an internal configuration of a wearable electronic device according to another embodiment of the disclosure.

Referring to FIG. 5, the electronic device 200 may receive power from an external electronic device (e.g., the electronic device 102 or 104 in FIG. 1). For example, the electronic device 200 may supply power to electronic components (e.g., a light output module 211, a speaker module, 245 and a camera module 250) by using an external power supply without including a battery (e.g., the battery 243 in FIG. 3) therein. All or some of the housing 210, the light output module 211, the speaker module 245, the power transmission structure 246, and the camera module 250 of FIG. 5 may be disposed in a same configuration as the housing 210, the light output module 211, the speaker module 245, the power transmission structure 246, and the camera module 250 as described previously in FIGS. 3 and 4.

According to certain embodiments, the electronic device 200 may include a connection terminal 248 (e.g., the connection terminal 178 in FIG. 1) enabling electrical connection to an external electronic device (e.g., the electronic device 102 in FIG. 1). According to an embodiment, the connection terminal 248 may include a universal serial bus (USB) connector.

According to certain embodiments, the power transmission structure 246 may be electrically connected to an external electronic device 102 via a connection terminal 248, and may transmit power received from the external electronic device 102 to an electronic component (e.g., a circuit board 241) of the electronic device 200.

According to certain embodiments, the connection terminal 248 may be disposed on at least a portion of the display member 203. According to an embodiment, the speaker module 245 may be disposed between the circuit board 241 and the connection terminal 248. According to an embodiment, the connection terminal 248 may be disposed on at least one of the ends 203a and 203b of the wearing member 203. For example, the electronic device 200 may receive power from the external electronic device 102 by using a first connection terminal 248a disposed on a first end 203a and/or a second connection terminal 248 disposed on a second end 203b. For example, the connection terminal 248 of the electronic device 200 may be electrically connected to the external electronic device 102 by using a cable C.

Figure 6:
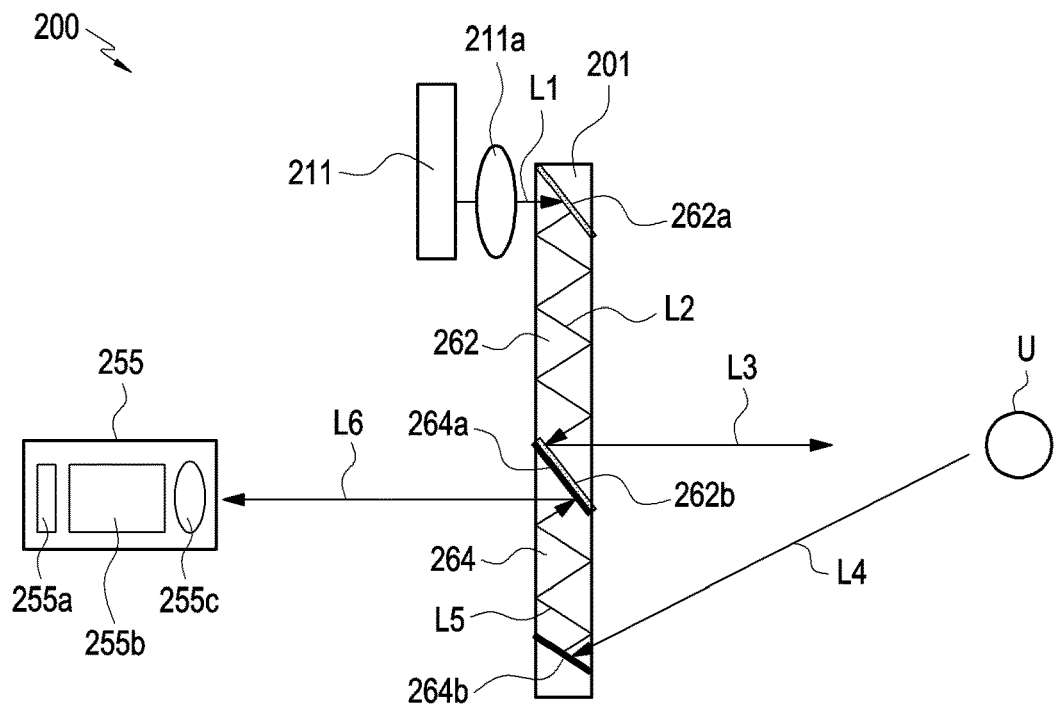
FIG. 6 is a schematic view illustrating a display member according to certain embodiments of the disclosure.

FIG. 6 is a schematic view illustrating a display member according to certain embodiments of the disclosure.

Referring to FIG. 6, an electronic device 200 may include a display member 201 and a third camera module 255. Some or all of the components of the display member 201 and the third camera module 255 of FIG. 6 may be the same in configuration as those of the display member 201 and the third camera module 255 of FIG. 3.

According to certain embodiments, the display member 201 may transmit light received from the light output module 211 to a user "U" (e.g., a user's eyes). According to an embodiment, the display member 201 may include a first waveguide 262 configured to guide light generated by the light output module 211. For example, first light L1 emitted from the light output module 211 may be transmitted to the first waveguide 262 through the lens 211a. The first waveguide 262 may include an input optical member 262a and an output optical member 262b. The traveling direction of the light transmitted to the first waveguide 262 (e.g., the first light L1) may be changed by an optical member (e.g., the input optical member 262a or the output optical member 262b). For example, the first light L1 may be incident to the first waveguide 262 by the input optical member 262a (e.g., second light L2), and the traveling direction of the light emitted from the first waveguide 262 may be changed by the output optical member 262b so that the light may be emitted toward the user U (e.g., third light L3).

According to certain embodiments, the display member 201 may transmit an image of the eyes of the user U to the third camera module 255. For example, the display member 201 may include a second waveguide 264 configured to guide light (e.g., fourth light L4) reflected from the eyes (e.g., pupils) of the user U to the third camera module 255, the light reflected from the eyes of the user U may be transmitted to the display member 201 through the second waveguide 264, and the light transmitted to the display member 201 (e.g., fifth light L5) may be transmitted to the third camera module 255. According to an embodiment, the second waveguide 264 may include a second light splitter 264b configured to change the direction of the light incident from the outside of the electronic device 200 (e.g., the fourth light L4), and a first light splitter 264a configured to change the direction of the light passing through the second waveguide 264 (e.g., the fifth light L5). According to an embodiment, the traveling direction of the light passing through the second waveguide 264 (e.g., the fifth light L5) may be changed by the first light splitter 264a, and may be transmitted to the third camera module 255 (e.g., sixth light L6).

According to certain embodiments, the third camera module 255 may include an image sensor 255a, an optical system 255b, and at least one lens 255c. The third camera module 255 may photograph the trajectory of the eyes (e.g., pupils) of the user U using the image sensor 255a, the optical system 255b, and at least one lens 255c. For example, the third camera module 255 may photograph the trajectory of the eyes (e.g., pupils) of the user U using the light reflected by the first light splitter 264a of the second waveguide 264 (e.g., the sixth light L6).

According to certain embodiments, the first waveguide 262 and/or the second waveguide 264 may be a free-form waveguide. The free-form first waveguide 262 may provide the light generated by the light output module 211 to the user U using the input optical member 262a and the output optical member 262b. The free-form second waveguide 264 may transmit light reflected from the user U to the third camera module 255 using the first light splitter 264a and the second light splitter 264b. According to an embodiment, the position of the light provided to the user U by the light output module 211 may be determined based on the light reflected from the user U transmitted to the third camera module 255 (e.g., the trajectory of the gaze).

According to certain embodiments, the input optical member 262a and the output optical member 262b of the first waveguide 262, and the first optical splitter 264a and the second optical splitter 264b of the second waveguide 264 may include at least one of at least one diffractive element (e.g., a diffractive optical element (DOE) or holographic optical element) and/or at least one reflective element (e.g., a reflective mirror). According to an embodiment, the at least one diffractive element may include an input optical member 262a and/or an output optical member 262b. According to an embodiment, the at least one reflective element may include a first light splitter 264a and/or a second light splitter 264b configured to perform total internal reflection (TIR). According to certain embodiments, the first waveguide 262 and/or the second waveguide 264 may be formed of glass, plastic, or polymer, and the first waveguide 262 and/or the second waveguide 264 may include a grating structure form in at least a portion (inside or outside) thereof. The lattice structure may have a polygonal or curved shape and may include nanopatterns. For example, the traveling direction of the light transmitted from the light output module 211 and/or the user U (e.g., the first light L1 or the fourth light L4) may be changed by the nanopatterns.

Figure 7:
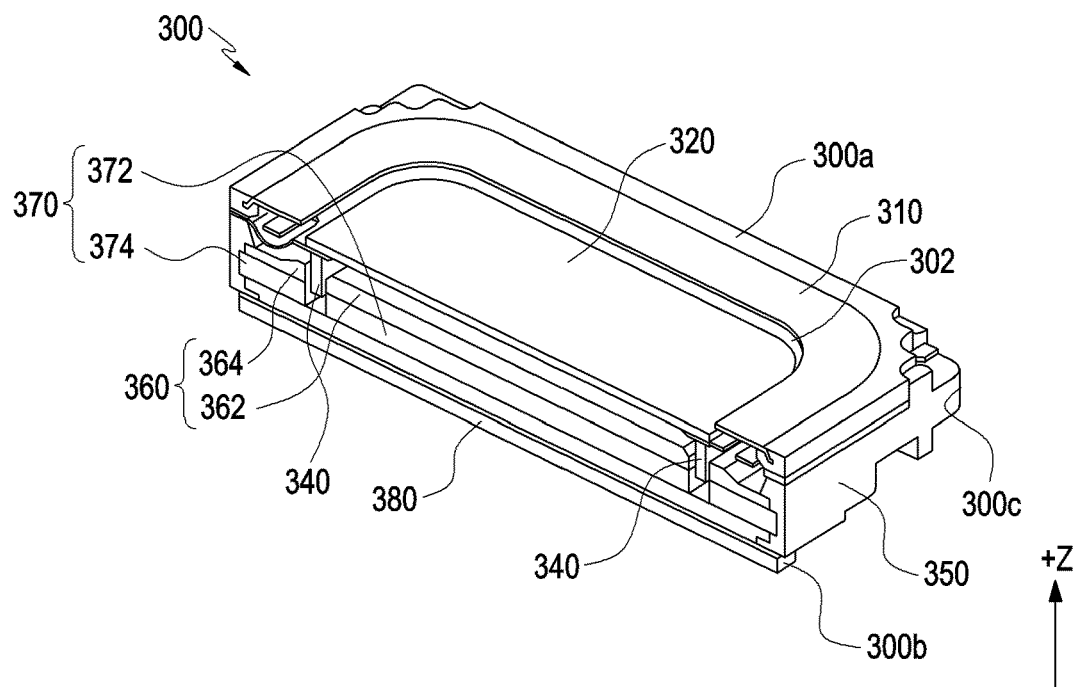
FIG. 7 is a cross-sectional perspective view of a speaker module according to certain embodiments of the disclosure.
Figure 8A:
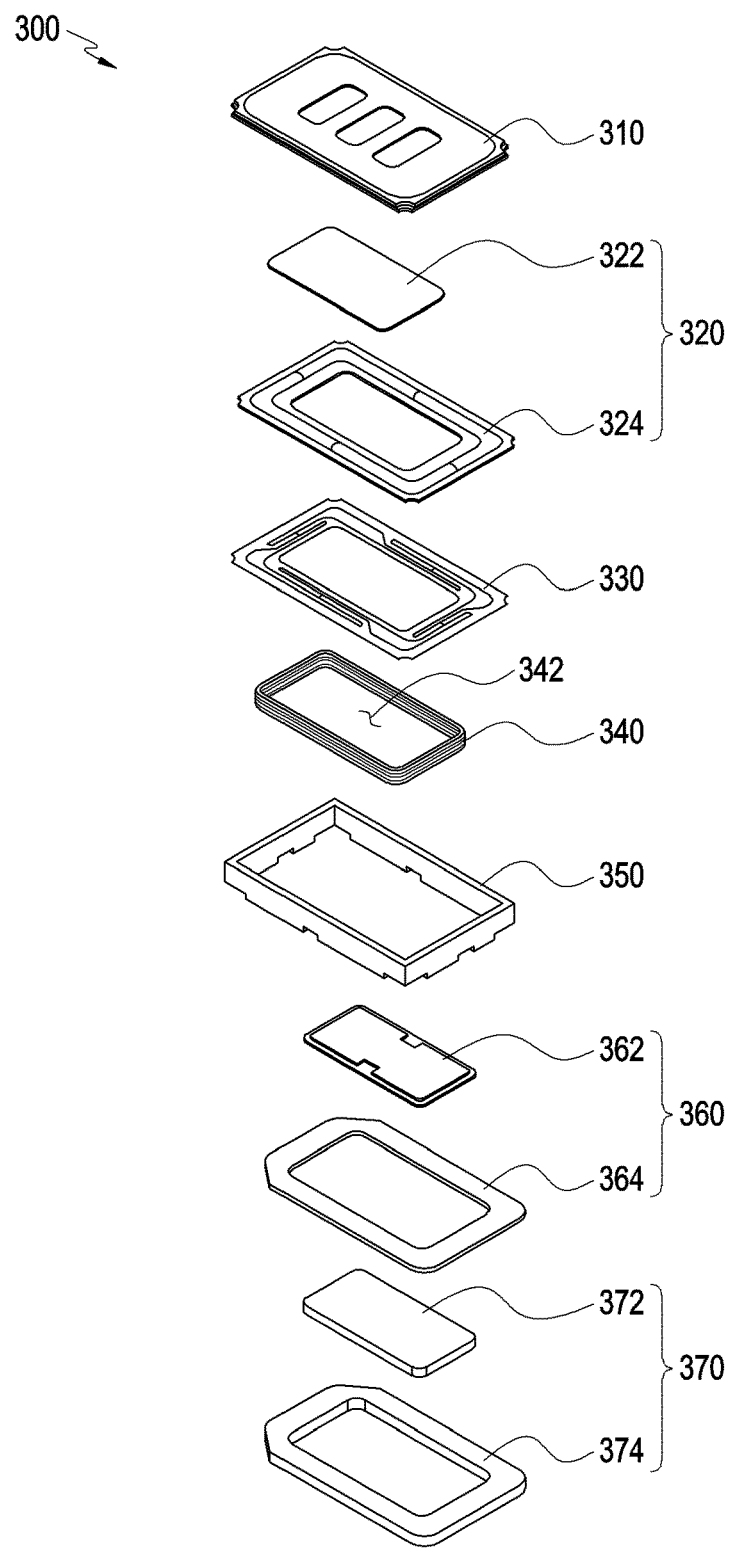
FIGS. 8A and 8B are exploded perspective views of a speaker module according to certain embodiments of the disclosure.
Figure 8B:
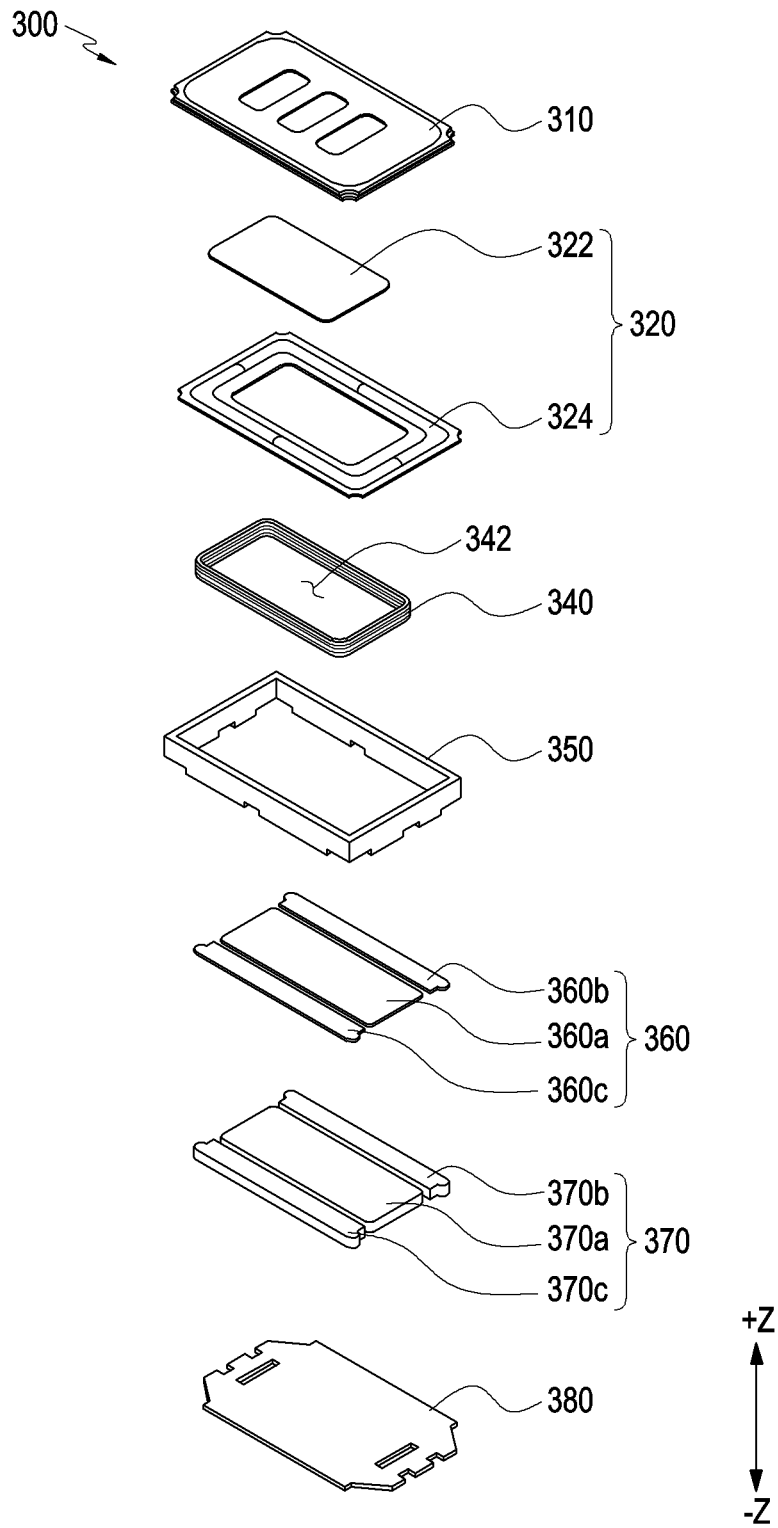

FIG. 7 is a cross-sectional perspective view of a speaker module according to certain embodiments of the disclosure. FIGS. 8A and 8B are exploded perspective views of a speaker module according to certain embodiments of the disclosure.

Referring to FIGS. 7, 8A, and 8B, a speaker module 300 may convert an electrical signal into sound or output a sound signal to the outside of an electronic device (e.g., the electronic device 200 in FIG. 2). All or some of the components of the speaker module 300 of FIGS. 7, 8A and 8B may be the same in configuration as the those of the speaker module 245, as previously described in FIGS. 3 to 5.

According to certain embodiments, the speaker module 300 may be electrically connected to a circuit board (e.g., the circuit board 241 in FIG. 5) via a flexible printed circuit board 302.

According to certain embodiments, the speaker module 300 may include a protective cover 310. According to an embodiment, the protective cover 310 may configure at least a portion of the top surface 300a (e.g., the surface in the +Z direction) of the speaker module 300. For example, at least a portion of the protective cover 310 may be located on a diaphragm 320. According to an embodiment, the protective cover 310 may protect a component (e.g., the diaphragm 320) of the speaker module 300. According to an embodiment, the protective cover 310 may include at least one of steel use stainless (SUS) (e.g., stainless steel (STS)), copper (Cu), aluminum (Al), magnesium (Mg), or CLAD (e.g., a laminated member in which SUS and Al are alternately arranged). According to an embodiment, the protective cover 310 may include various alloy materials. According to an embodiment, the protective cover 310 may be formed of a polymer material, coated or colored glass, ceramic, or a combination of at least two of the above materials.

According to certain embodiments, the speaker module 300 may include at least one diaphragm 320. According to an embodiment, the at least one diaphragm 320 may generate a sound signal by vibrating (e.g., reciprocating in the +Z/−Z direction) based on an electrical signal generated by a coil 340. For example, mechanical vibration may be generated due to the reciprocating motion of the diaphragm 320 or a change in sound pressure according to sound output of the diaphragm 320. According to an embodiment, as the speaker module 300 outputs sound in a low-pitched band, generated vibrations may become stronger. According to an embodiment, the first diaphragm 322 may be a dome-shaped diaphragm, and the second diaphragm 324 may be a dome-shaped diaphragm disposed under the first diaphragm 322 (e.g., in the −Z direction). According to another embodiment, the first diaphragm 322 may be a dome-shaped diaphragm, and the second diaphragm 324 may be a diaphragm surrounding at least a portion of the first diaphragm 322. According to an embodiment, the at least one diaphragm 320 may include a first diaphragm 322 configured to vibrate in a first frequency band (e.g., a high-pitched band) and a second diaphragm 324 configured to vibrate in a second frequency band (e.g., a low-pitched band) different from the first frequency band. According to an embodiment, the diaphragm 320 may be disposed on the coil 340. For example, the diaphragm 320 may be disposed between the protective cover 310 and the frame 350.

According to certain embodiments, the speaker module 300 may include a damping member 330. According to an embodiment, the damping member 330 may be formed of a conductive material, and may transmit a signal (e.g., power) received from the outside of the speaker module 300 to the coil 340 via the damping member 330. According to an embodiment, the damping member 330 may be disposed between the diaphragm 320 and the frame 350. According to an embodiment, the damping member 330 may include an elastic member (e.g., a spring).

According to certain embodiments, the speaker module 300 may include a coil 340. The coil 340 may vibrate the diaphragm 320 based on an electrical signal (e.g., a pulse width modulation (PWM) signal). According to an embodiment, the coil 340 may be a voice coil.

According to certain embodiments, the speaker module 300 may include a frame 350. The frame 350 may accommodate components of the speaker module 300 (e.g., a diaphragm 320, a magnet 370, or a plate 360) and may configure at least a portion of the outer surface of the speaker module 300. For example, the frame 350 may configure a side surface 300c of the speaker module 300. According to certain embodiments, the speaker module 300 may be provided with an enclosure configured with the protective cover 310, the frame 350, and a yoke 380. For example, the enclosure (speaker enclosure) may refer to a housing or casing enclosing the speaker module 300. In some embodiments, the enclosure may be a resonator configured to accumulate at least some of the sound generated by the speaker module 300. According to certain embodiments, the speaker module 300 may include at least one plate 360. According to an embodiment, the plate 360 may be formed of a conductive material, and the plate 360 may concentrate a magnetic field generated by the magnet 370. According to an embodiment, the plate 360 may have various shapes. For example (e.g., FIG. 8A), the plate 360 may include a first plate 362 surrounded by the coil 340 and a second plate 364 disposed along the rim of the speaker module 300. As another example (e.g., FIG. 8B), the plate 360 may include a plurality of divided plates 360a, 360b, and 360c. The plurality of divided plates 360a, 360b, and 360c may be located on substantially the same plane.

According to certain embodiments, the speaker module 300 may include at least one magnet 370. According to an embodiment, the magnet 370 may generate a magnetic field. When a current flows through the coil 340, the speaker module 300 may output sound by causing vibration of the diaphragm 320 using the magnetic field generated in the coil 340 and the magnetic field generated by the magnet 370. According to an embodiment, the magnet 370 may be disposed under the plate 360 (e.g., in the −Z direction). According to an embodiment, the magnet 370 may have various shapes. For example (e.g., FIG. 8A), the magnet 370 may include a first magnet 372 disposed under the first plate 362 and a second magnet 374 disposed under the second plate 364. For example, the second magnet 374 may be disposed along the periphery of the first magnet 372. As another example (e.g., FIG. 8B), the magnet 370 may include a plurality of divided magnets 370a, 370b, and 370c. The plurality of divided magnets 370a, 370b, and 370c may be located on substantially the same plane. According to an embodiment, the plurality of magnets 370a, 370b, and 370c may have shapes corresponding to the shapes of the plurality of plates 360a, 360b, and 360c.

According to certain embodiments, the speaker module 300 may include a yoke 380. According to an embodiment, the yoke 380 may configure at least a portion of the bottom surface 300b (e.g., the surface in the −Z direction) of the speaker module 300. For example, the yoke 380 may be located under the magnet 370 (e.g., in the −Z direction). According to an embodiment, the yoke 380 may be disposed so as to protect the components of the speaker module 300 (e.g., the magnet 370). According to an embodiment, the yoke 380 may guide the magnetic field generated by the magnet 370. According to an embodiment, the yoke 380 may include a plurality of through holes.

According to certain embodiments, the coil 340 may be provided to surround the central area 342. According to an embodiment, at least one of the plates 360 or the magnets 370 (e.g., the first plate 362 or the first magnet 372) may be disposed within the central area 342, and the coil 340 may surround at least one of the plates 360 or the magnets 370 located in the central area 342.

According to certain embodiments, the speaker module 300 may include a plurality of speaker units disposed in the enclosure. For example, the speaker module 300 may include a plurality of speaker units (e.g., a normal speaker, a woofer speaker, and/or a tweeter speaker) configured to output sound in different frequency bands. According to an embodiment, the speaker module 300 may include a crossover circuit (e.g., a pass filter) configured to allocate frequency bands driven by the plurality of speaker units.

Figure 9:
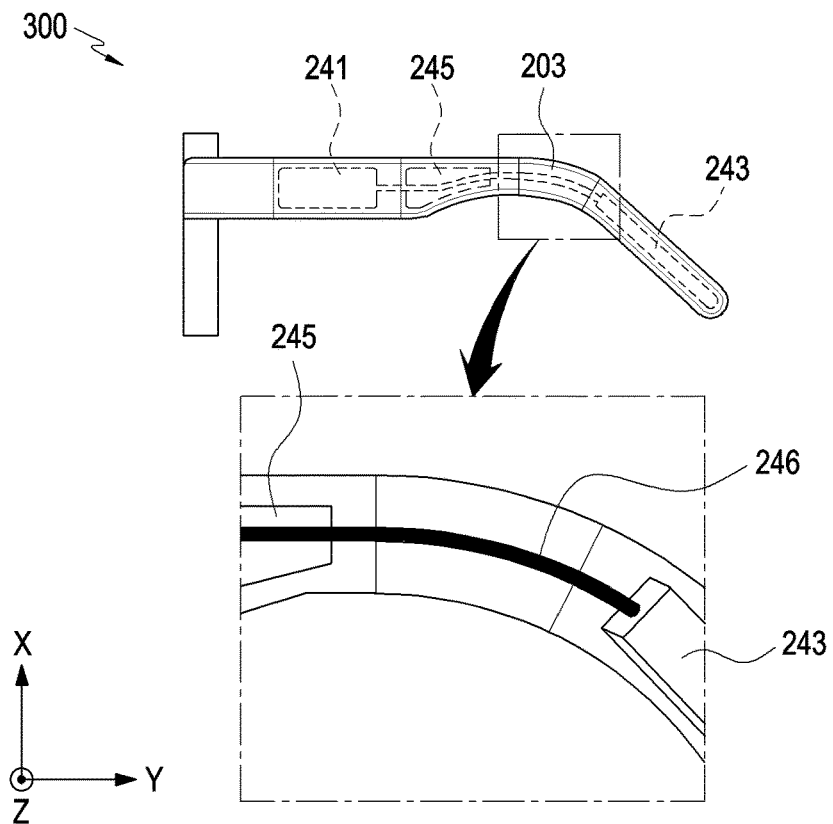
FIG. 9 is a view illustrating an arrangement relationship of a speaker module, a power transmission structure, and a battery according to certain embodiments of the disclosure.

FIG. 9 is a view illustrating an arrangement relationship of a speaker module, a power transmission structure, and a battery according to certain embodiments of the disclosure.

Referring to FIG. 9, a circuit board 241, a battery 243, a speaker module 245, and a power transmission structure 246 may be disposed in a wearing member 203. All or some of the circuit board 241, the battery 243, the speaker module 245, and the power transmission structure 246 of FIG. 9 may be disposed in the same configuration as the circuit board 241, the battery 243, the speaker module 245, and the power transmission structure 246, as previously described with reference to FIGS. 3 and 4.

According to certain embodiments, the electronic device 200 may be configured in a structure for improving the user mounting convenience. For example, the positions of electronic components (e.g., the circuit board 241 and/or the speaker module 245) may be variously changed within the wearing member (e.g., the wearing member 203 in FIG. 2) such that the weight of the electronic device 200 may be evenly distributed in the state in which the user wears the electronic device 200. According to an embodiment, within the wearing member 203, the circuit board 241 may be disposed adjacent to the lens frame (e.g., the lens frame 202 in FIG. 2), and an electronic component heavier than the circuit board 241 (e.g., the battery 243) may be disposed farther from the lens frame 202 than the circuit board 241. According to an embodiment, the speaker module 245 may be disposed in the wearable member 203 of the housing (e.g., the housing 210 in FIG. 3) between the circuit board 241 and the battery 243 so as to locate the speaker module 245 close to the user's ear in the state in which the user wears the electronic device 200.

According to certain embodiments, the power transmission structure 246 connected to the battery 243 may pass through at least a portion of the speaker module 245 to be connected to the circuit board 241. According to an embodiment, the power transmission structure 246 may pass above the speaker module 245 (e.g., in the +Z direction). For example, at least a portion of the power transmission structure 246 may be disposed between the speaker module 245 and an inner side surface (e.g., the inner side surface 231c in FIG. 2). For example, the power transmission structure 246 may at least partially pass through the space between the protective cover (e.g., the protective cover 310 in FIG. 8) of the speaker module 245 and the inner case 231 of the wearing member 203. According to another embodiment, the power transmission structure 246 may pass under the speaker module 245 (e.g., in the −Z direction). The power transmission structure 246 may be disposed between the speaker module 245 and an outer side surface (e.g., the outer side surface 231d in FIG. 2). For example, the power transmission structure 246 may pass through the space between the yoke of the speaker module 245 (e.g., the yoke 380 in FIG. 8) and the outer case 233 of the wearing member 203.

Figure 10:
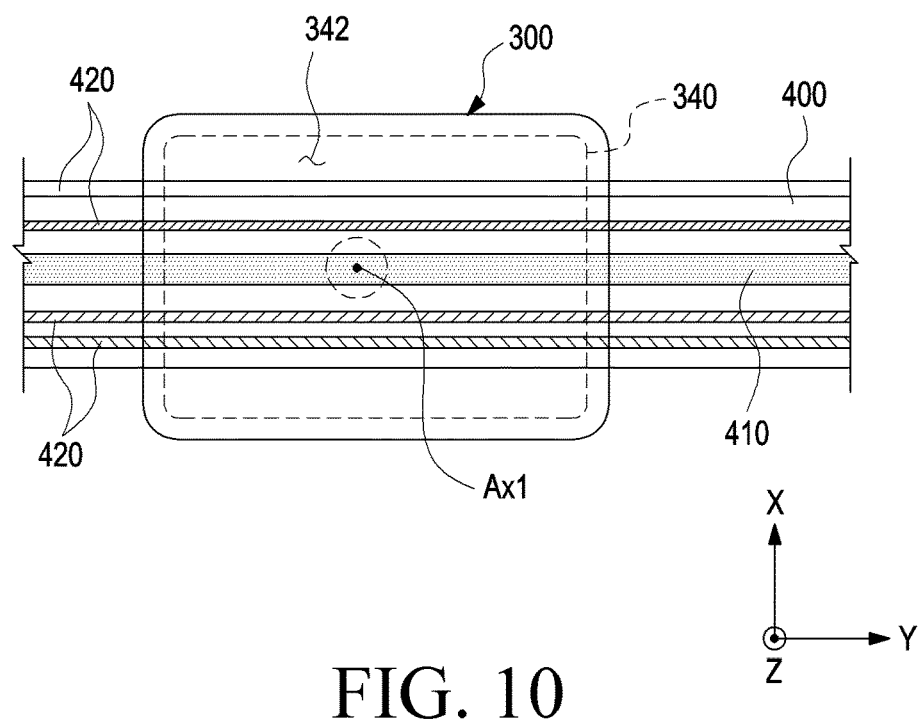
FIG. 10 is a schematic view illustrating a positional relationship between a power transmission structure and a speaker module according to certain embodiments of the disclosure.
Figure 11:
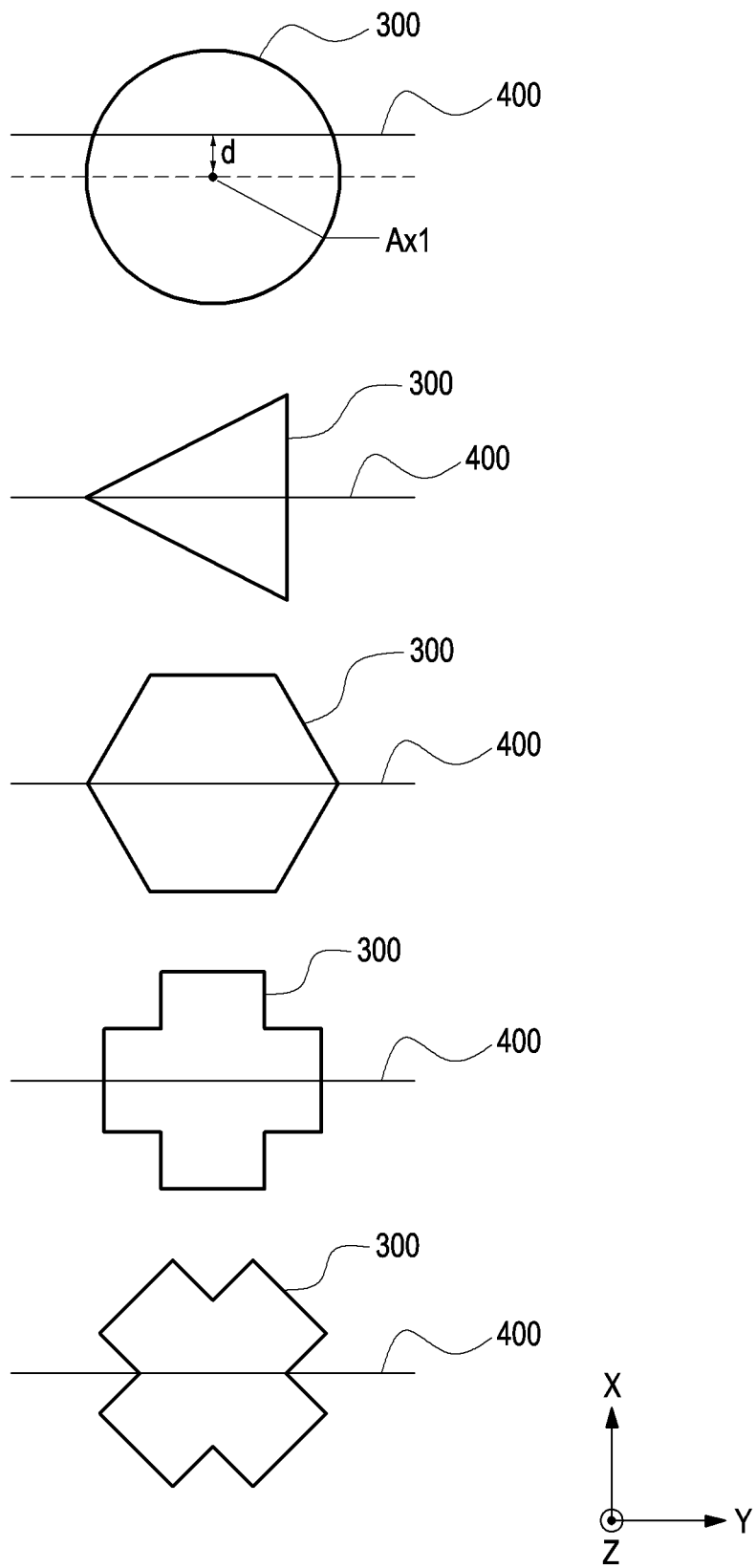
FIG. 11 is a schematic view illustrating speaker modules according to certain embodiments of the disclosure.
Figure 12:
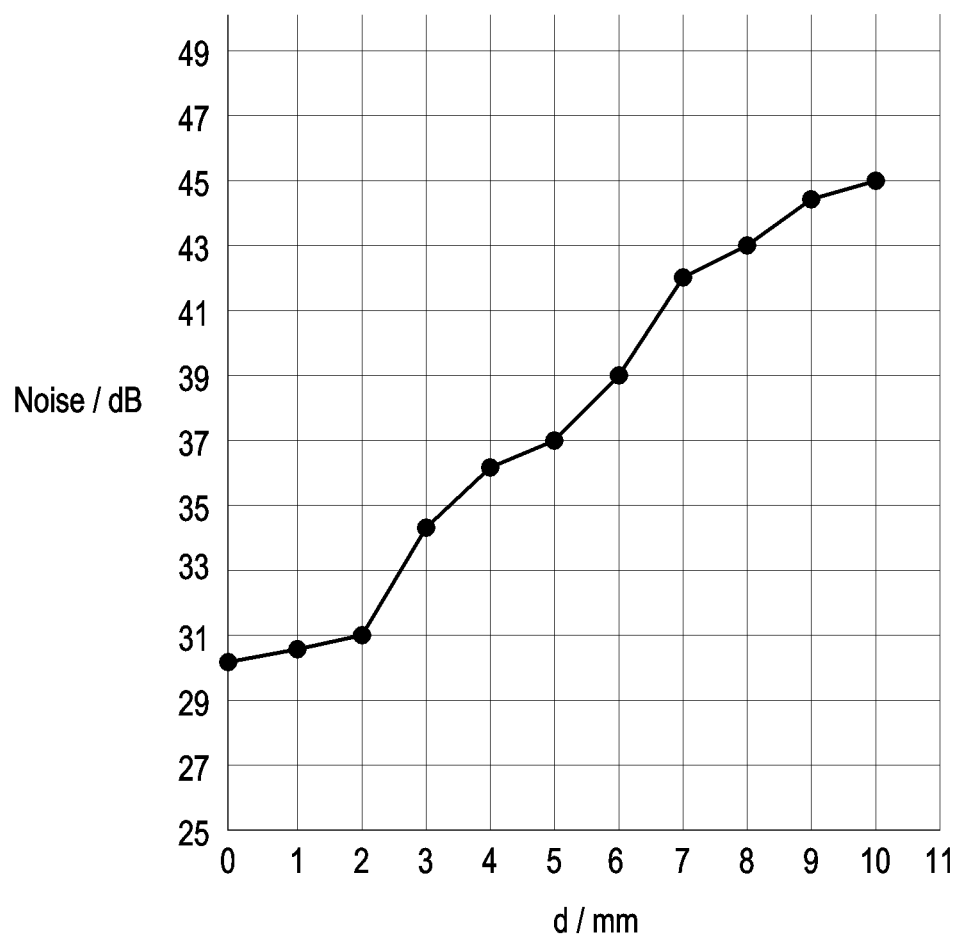
FIG. 12 is a diagram illustrating noise of a speaker module depending on a position of a power transmission structure according to certain embodiments of the disclosure.

FIG. 10 is a schematic view illustrating a positional relationship between a power transmission structure and a speaker module according to certain embodiments of the disclosure. FIG. 11 is a schematic view illustrating speaker modules according to certain embodiments of the disclosure. FIG. 12 is a diagram illustrating noise of a speaker module depending on a position of a power transmission structure according to certain embodiments of the disclosure. Referring to FIGS. 10 to 12, the electronic device 200 may include a speaker module 300 and a power transmission structure 400 at least partially overlapping at least a portion of the speaker module 300. All or some of the components of the speaker module 300 and the power transmission structure 400 of FIGS. 10 and 11 may be disposed in the same configuration as those of the speaker module 245 and the power transmission structure 246, as previously described in FIG. 9.

According to certain embodiments, the speaker module 300 may include a coil 340, which may be disposed so as to surround a first virtual axis Ax1. According to an embodiment, the first virtual axis Ax1 may be a virtual axis located in the center of the central area 342. For example, when the coil 340 is a circular coil, the first virtual axis Ax1 may pass through at least a portion of the coil 340 from the origin of the coil 340 and may be substantially perpendicular to one surface (e.g., the top surface 300a in FIG. 7) of the speaker module 300. According to an embodiment, the power transmission structure 400 may be substantially perpendicular to the first virtual axis Ax1. For example, the power transmission structure 400 may be substantially parallel to one surface (e.g., the top surface 300a) of the speaker module 300.

According to certain embodiments, the power transmission structure 400 may at least partially overlap the center of the coil 340. For example, the power transmission structure 400 may be located above the central area 342 of the coil 340 (e.g., in the +Z direction) or below (e.g., in the −Z direction). According to an embodiment, the power transmission structure 400 may overlap at least a portion of the first virtual axis Ax1 of the coil 340.

According to certain embodiments, the power transmission structure 400 may include a power transmission line 410 configured to transmit/receive power, and a plurality of data transmission lines 420 configured to transmit/receive an electrical signal (e.g., USB data). According to an embodiment, the power transmission line 410 may be located substantially in the center of the power transmission structure 400. For example, the plurality of data transmission lines 420 may surround the power transmission line 410. As another example, the power transmission line 410 may be disposed between the plurality of data transmission lines 420, and the plurality of data transmission lines 420 may be spaced apart from each other. According to certain embodiments, the power transmission line 410 and/or the data transmission lines 420 may include different powers, respectively. For example, the power transmission line 410 may include analog power (AVDD) or digital power or digital core power (DVDD), and the data transmission line 420 may provide input output power (IOVDD).

According to certain embodiments, the power transmission structure 400 may at least partially overlap the speaker module 300. According to an embodiment, at least a portion of the power transmission structure 400 may overlap the components of the speaker module 300 (e.g., the protective cover 310, the diaphragm 320, the damping member 330, the coil 340, the frame 350, the plate 360, the magnet 370, or the yoke 380 of FIG. 8). For example, when the speaker module 300 is viewed from a front view (as illustrated in FIG. 10; e.g., the +Z direction), at least a portion of the power transmission structure 400 may overlap the diaphragm 320, the plate 360, the magnet 370, and the yoke 380. According to an embodiment, when the speaker module 300 is viewed from above (as illustrated in FIG. 10; e.g., the +Z direction), the power transmission structure 400 may pass through at least a portion the central area 342 of the coil 340.

According to certain embodiments, the speaker module 300 may be formed in various shapes. FIGS. 7, 8A, and 8B show a quadrangular speaker module 300, but the shape of the speaker module 300 is not limited thereto. For example, the speaker module 300 may have various shapes such as a circle, a quadrangle, a triangle, a polygon, a cross shape, or the like. According to an embodiment, at least a portion of the power transmission structure 400 may pass through a substantial center of the speaker module 300. For example, when the power transmission structure 400 is viewed from above the speaker module 300 (e.g., the Z direction), the power transmission structure 400 may pass through the center (e.g., the center of gravity) of the diaphragm (e.g., the diaphragm 320 in FIG. 8A) of the speaker module 300. According to an embodiment, when the power transmission structure 400 is viewed from above the speaker module 300 (e.g., the Z direction), the power transmission structure 400 may pass through the center of the coil 340 (e.g., the first virtual axis Ax1). For example, the coil 340 may be symmetrical about the power transmission structure 400.

According to certain embodiments, noise generated from the speaker module 300 may be changed based on the position of the power transmission structure 400. For example, according to the distance "d" between the power transmission structure 400 and the center of the speaker module 300 (e.g., the horizontal axis d/mm in FIG. 12), the magnitude of noise (e.g., the vertical axis (noise/dB) in FIG. 12) generated from the speaker module 300 may be changed. According to an embodiment, when the power transmission structure 400 is located closer to the central axis (e.g., the first virtual axis Ax1) of the speaker module 300, the noise generated from the speaker module 300 is reduced. For example, when the power transmission structure 400 is disposed so as to overlap the center of the coil 340, the coil 340 is symmetrical about the power transmission structure 400, and the noise generated in the coil 340 due to the power flowing through the power transmission structure 400 may at least partially cancel out.

Figure 13:
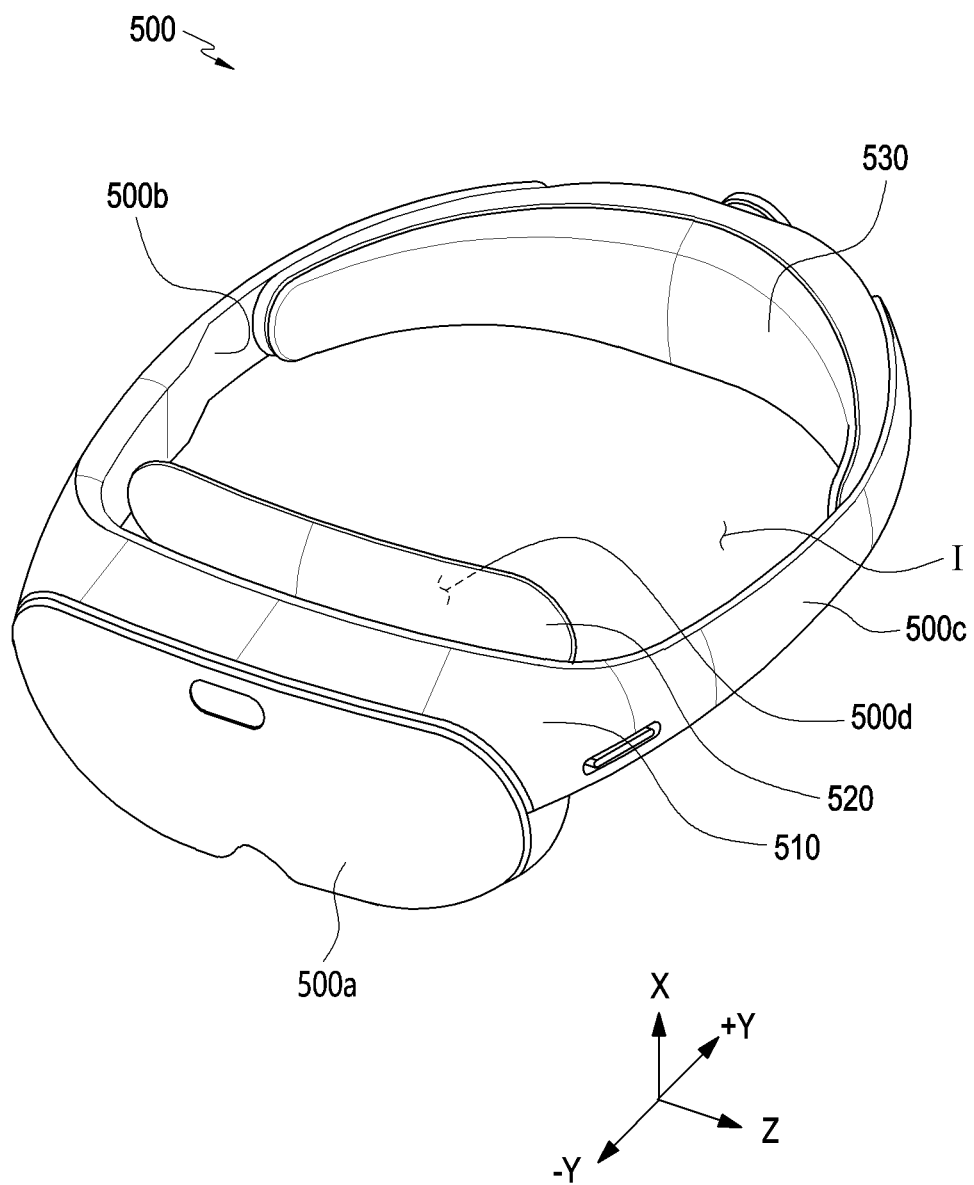
FIG. 13 is another perspective view of a wearable electronic device according to certain embodiments of the disclosure.

FIG. 13 is another perspective view of a wearable electronic device according to certain embodiments of the disclosure.

Referring to FIG. 13, the electronic device 500 may be a head mounting device (HMD) capable of providing an image in front of a user's eyes. All or some of the components of the electronic device 500 of FIG. 13 may be the same in configuration as those of the electronic device 200, as previously described with reference to FIG. 2.

According to certain embodiments, the electronic device 500 may include housings 510, 520, and 530 which form the exterior of the electronic device 500 and provide internal spaces in which the components of the electronic device 500 may be disposed.

According to certain embodiments, the electronic device 500 may include a first housing 510, that is configured to surround at least a portion of the user's head. According to an embodiment, the first housing 510 may include a first surface 500a facing outside of the electronic device 500 (e.g., the −Y direction).

According to certain embodiments, the first housing 510 may surround at least a portion of the inner space I. For example, the first housing 510 may include a second surface 500b facing the inner space I of the electronic device 500 and a third surface 500c opposite to the second surface 500b. According to an embodiment, the first housing 510 may be coupled to the third housing 530 to have a closed curve shape surrounding the inner space I.

According to certain embodiments, the first housing 510 may accommodate at least some of the components of the electronic device 500. For example, a light output module (e.g., the light output module 211 in FIG. 3) and a circuit board (e.g., the circuit board 241 and the speaker module 245 in FIG. 3) may be disposed in the first housing 510.

According to certain embodiments, the first housing 510 of the electronic device 500 may be formed in a shape including a single display member (e.g., the display member 201 in FIG. 2) corresponding to left and right eyes.

According to certain embodiments, the electronic device 500 may include a second housing 520 that is configured to allow seating on the user's face. According to an embodiment, the second housing 520 may include a fourth surface 500d that may at least partially face the user's face. According to an embodiment, the fourth surface 500d may be a surface facing the inner space I of the electronic device 500 (e.g., the +Y direction).

According to certain embodiments, the electronic device 500 may include a third housing 530 that is configured to be seated on the rear portion of the user's head. According to an embodiment, the third housing 530 may be coupled to the first housing 510. According to an embodiment, the third housing 530 may accommodate at least some of the components of the electronic device 500. For example, a battery (e.g., the battery 243 in FIG. 3) may be disposed in the third housing 530.

According to certain embodiments of the disclosure, a wearable electronic device (e.g., the wearable electronic device 200 in FIG. 2) may include a housing (e.g., the housing 210 in FIG. 2), a light output module (e.g., the light output module 211 in FIG. 3) disposed in the housing and configured to output an image, a speaker module (e.g., the speaker module 245 in FIG. 3) disposed in the housing and including a conductive plate (e.g., the first plate 362 in FIG. 8) and a coil (e.g., the coil 340 in FIG. 8) formed to surround the plate, a battery (e.g., the battery 243 in FIG. 3) disposed in the housing, and a power transmission structure (e.g., the power transmission structure 246 in FIG. 3) disposed in the housing and configured to transmit power from the battery to the light output module. At least a portion of the power transmission structure may be located above the plate.

According to certain embodiments, the wearable electronic device may further include a circuit board (e.g., the circuit board 241 in FIG. 3) disposed in the housing and electrically connected to the battery using the power transmission structure, and the speaker module may be disposed between the circuit board and the battery.

According to certain embodiments, the wearable electronic device may further include a display member (e.g., the display member 201 in FIG. 2) including a first waveguide (e.g., the first waveguide 262 in FIG. 6) configured to guide light generated by the light output module.

According to certain embodiments, the housing may include a lens frame (e.g., the lens frame 202 in FIG. 3) configured to accommodate the display member, and a wearing member (e.g., the wearing member 203 in FIG. 3) coupled to at least one side of the lens frame and configured to accommodate the speaker module and the battery.

According to certain embodiments, the housing may include a hinge structure (e.g., the hinge structure 229 in FIG. 3) configured to allow the wearing member to rotate relative to the lens frame.

According to certain embodiments, the wearing members may each include an inner case (e.g., the inner case 231 in FIG. 3) including an inner side surface (e.g., the inner side surface 231c in FIG. 3) configured to face the user's body when worn, and an outer case (e.g., the outer case 233 in FIG. 3) including an outer side surface (e.g., the outer side surface 231d in FIG. 3) opposite to the inner side surface.

According to certain embodiments, at least a portion of the power transmission structure may be disposed between the speaker module and the inner side surface.

According to certain embodiments, at least a portion of the power transmission structure may be disposed between the speaker module and the outer side surface.

According to certain embodiments, the wearable electronic device may further include at least one first camera module (e.g., the first camera module 251 in FIG. 5) configured to capture a user's movements, a second camera module (e.g., the second camera module 253 in FIG. 5) configured to capture an external image, and at least one third camera module (e.g., the third camera module 255 in FIG. 5) configured to detect the trajectory of the user's eye. The display member may include a second waveguide (e.g., the second waveguide 264 in FIG. 6) configured to guide light (e.g., the fourth light L4 in FIG. 6) directed to the third camera module.

According to certain embodiments, the speaker module may include at least one diaphragm (e.g., the diaphragm 320 in FIG. 8) disposed on the coil, a protective cover (e.g., the protective cover 310 in FIG. 8) disposed on the at least one diaphragm, at least one magnet (e.g., the magnet 370 in FIG. 8) disposed under the plate, and a yoke (e.g., the yoke 380 in FIG. 8) disposed under the at least one magnet.

According to certain embodiments, at least a portion of the power transmission structure may overlap the coil, the plate, the diaphragm, the protective cover, the magnet, and the yoke.

According to certain embodiments, the power transmission structure may be a flexible printed circuit board or a wire.

According to certain embodiments, the coil may be formed to surround a central area in which the plate is located (e.g., the central area 342 in FIG. 8), and the power transmission structure may overlap a first virtual axis (e.g., the first virtual axis Ax1 in FIG. 10) passing through the central area.

According to certain embodiments, the housing may include a first housing (e.g., the first housing 510 in FIG. 11) formed to surround at least a portion of the user's head, a second housing (e.g., the second housing 520 in FIG. 11) coupled to the first housing and configured to be seated on the user's face, and a third housing (e.g., the third housing 530 in FIG. 11) coupled to the first housing and configured to be seated on the rear portion of the user's head.

According to certain embodiments, the light output module and the speaker module may be disposed in the first housing, and the battery may be disposed in the third housing.

According to certain embodiments of the disclosure, a wearable electronic device (e.g., the wearable electronic device 500 in FIG. 11) may include a housing (e.g., the housings 510, 520, and 530 in FIG. 11), a light output module (e.g., the light output module 211 in FIG. 5) disposed in the housing and configured to output an image, a speaker module (e.g., the speaker module 300 in FIG. 8) disposed in the housing and including a coil (e.g., the coil 340 in FIG. 8) formed to surround a central area (e.g., the central area 342 in FIG. 8), a connection terminal (e.g., the connection terminal 248 in FIG. 5) disposed in the housing and configured to receive power from an external electronic device (e.g., the electronic device 102 of FIG. 1), and a power transmission structure (e.g., the power transmission structure 246 in FIG. 5) configured to transmit the received power to the optical output module. At least a portion of the power transmission structure may be located above the central area.

According to certain embodiments, the wearable electronic device may further include a circuit board (e.g., the circuit board 241 in FIG. 5) disposed in the housing and electrically connected to the external electronic device by using the power transmission structure, and the speaker module may be disposed between the circuit board and the connection terminal.

According to certain embodiments, the wearable electronic device may further include a display member (e.g., the display member 201 in FIG. 6) including a first waveguide (e.g., the first waveguide 262 in FIG. 6) configured to guide light generated by the light output module.

According to certain embodiments, the housing may include a lens frame (e.g., the lens frame 202 in FIG. 5) configured to accommodate the display member, and a wearing member (e.g., the wearing member 203 in FIG. 5) coupled to at least one side of the lens frame and configured to accommodate the speaker module and the connection terminal.

According to certain embodiments, the speaker module may include at least one diaphragm (e.g., the diaphragm 320 in FIG. 8) disposed on the coil, a protective cover (e.g., the protective cover 310 of FIG. 8) disposed on the at least one diaphragm, a conductive plate (e.g., the plate 360 in FIG. 8) at least partially disposed within the central area, a magnet (e.g., the magnet 370 in FIG. 8) disposed under the plate, and a yoke (e.g., the yoke 380 in FIG. 8) disposed under the at least one magnet. At least a portion of the power transmission structure may overlap the coil, the plate, the diaphragm, the protective cover, the magnet, and the yoke.

It may be apparent to a person ordinarily skilled in the technical field to which the disclosure belongs that the above-described wearable electronic device including various speaker modules according to the disclosure is not limited by the above-described embodiments and drawings, and can be variously substituted, modified, and changed within the technical range of the disclosure.

What is claimed is:
1. A wearable electronic device, comprising:
a housing including an inner case, and an outer case coupled to the inner case, wherein the inner case faces a user's body when the wearable device is worn, and the outer case faces away from the user's body when the wearable device is worn;
a light output module disposed in the housing and configured to output an image;
a speaker module disposed in the housing, the speaker module including a coil including an opening and a conductive plate at least partially located in the opening;
a battery disposed in the housing; and
a power transmission structure disposed in the housing, and configured to transmit power from the battery to the light output module,
wherein at least a portion of the power transmission structure is disposed between the outer case and the speaker module so as to overlap the plate and the opening.

2. The wearable electronic device of claim 1, further comprising a circuit board disposed in the housing and electrically connected to the battery by the power transmission structure,
wherein the speaker module is disposed between the circuit board and the battery.

3. The wearable electronic device of claim 1, further comprising a display member comprising a first waveguide configured to guide a path of light generated by the light output module.

4. The wearable electronic device of claim 3, wherein the housing comprises a lens frame supporting the display member, and a wearing member coupled to at least one side of the lens frame that supports the speaker module and the battery.

5. The wearable electronic device of claim 4, wherein the housing comprises a hinge structure allowing rotation of the wearing member relative to the lens frame.

6. The wearable electronic device of claim 4, wherein the inner case includes an inner side surface, and the outer case includes an outer side surface disposed opposite to the inner side surface.

7. The wearable electronic device of claim 6, wherein at least a portion of the power transmission structure is disposed between the speaker module and the outer side surface.

8. The wearable electronic device of claim 6, wherein at least a portion of the power transmission structure is disposed between the speaker module and the outer side surface.

9. The wearable electronic device of claim 3, further comprising:
a first camera module configured to capture a movement of a user;
a second camera module configured to capture an external image; and
a third camera module configured to detect a trajectory of a user's gaze,
wherein the display member comprises a second waveguide to direct light towards the third camera module.

10. The wearable electronic device of claim 1, wherein the speaker module comprises at least one diaphragm disposed on the coil, a protective cover disposed on the at least one diaphragm, at least one magnet disposed under the plate, and a yoke disposed under the at least one magnet.

11. The wearable electronic device of claim 10, wherein at least a portion of the power transmission structure overlaps the coil, the plate, the diaphragm, the protective cover, the magnet, and the yoke.

12. The wearable electronic device of claim 1, wherein the power transmission structure includes a flexible printed circuit board (FPCB) or a wire.

13. The wearable electronic device of claim 1,
wherein the power transmission structure overlaps a first virtual axis passing through the opening.

14. The wearable electronic device of claim 1, wherein the housing comprises:
a first housing configured to surround at least a portion of a user's head;
a second housing coupled to the first housing and configured to be seated on a user's face; and
a third housing coupled to the first housing and configured to be seated on a rear portion of the user's head.

15. The wearable electronic device of claim 14, wherein the light output module and the speaker module are disposed in the first housing, and the battery is disposed in the third housing.

16. A wearable electronic device, comprising:
a housing including an inner case, and an outer case coupled to the inner case, wherein the inner case faces a user's body when the wearable device is worn, and the outer case faces away from the user's body when the wearable device is worn;
a light output module disposed in the housing and configured to output an image;
a speaker module disposed in the housing, the speaker module including a coil including an opening and a conductive plate at least partially located in the opening;
a battery disposed in the housing; and
a power transmission structure disposed in the housing, and configured to transmit power from the battery to the light output module,
wherein at least a portion of the power transmission structure is disposed between the inner case and the speaker module so as to overlap the plate and the opening.

* * * * *